Nov. 16, 1965

H. FORWALD 3,217,842

DAMPING DEVICE

Filed Aug. 28, 1964

INVENTOR.
HAAKON FORWALD
BY Bailey, Stephens & Huettig

United States Patent Office

3,217,842
Patented Nov. 16, 1965

3,217,842
DAMPING DEVICE
Haakon Forwald, Ludvika, Sweden, assignor to Allmänna
Svenska Elektriska Aktiebolaget, Vasteras, Sweden, a
corporation of Sweden
Filed Aug. 28, 1964, Ser. No. 392,794
Claims priority, application Sweden, Sept. 6, 1963,
9,760/63
3 Claims. (Cl. 188—96)

This invention relates to a novel damping mechanism, and more specifically relates to a damping mechanism or dash pot type device for absorbing the inertia of a moving body and bringing the body to a substantial standstill without rebound.

Damping devices for mechanisms are old and well known in the art for bringing a moving body to a standstill in a smooth manner without permitting rebound. By way of example, it is common practice to connect the movable part of some mechanism, such as the movable contact of a circuit braker, to a piston which moves within a cylinder whereby movement of the contact will cause the piston to move into the cylinder. This compresses the air beneath the piston thereby slowing down the piston motion and the moving contact motion to zero.

A common drawback in such mechanisms is that the pressure beneath the pistons becomes so great that once zero piston position is achieved, the very high pressure within the cylinder causes the piston to move backwardly, thus causing a rebound following the arrested motion.

The principle of the present invention is to provide a novel damping structure utilizing a piston and cooperating cylinder wherein after a portion of the stroke of the piston with respect to the cylinder, a port defined by a member having conical walls and extending between the piston and the cylinder is opened to prevent a continued increase in back pressure behind the piston, and to retain this pressure at a relatively constant value with the speed of the movable body being slowly brought to zero without danger of serious rebound.

Accordingly, a primary object of this invention is to provide a novel dash pot type structure.

Another object of this invention is to provide an inertia absorbing device which is not subject to rebound.

A further object of this invention is to provide a novel rod extending between a damping piston and its respective cylinder which has a tapered section therein defining a pressure relieving port for relieving the pressure beneath the piston after a predetermined motion of the piston.

Another object of this invention is to provide a novel damping device using a piston and cylinder which permits substantially the whole length of the cylinder for use in the damping process.

Figure 1:
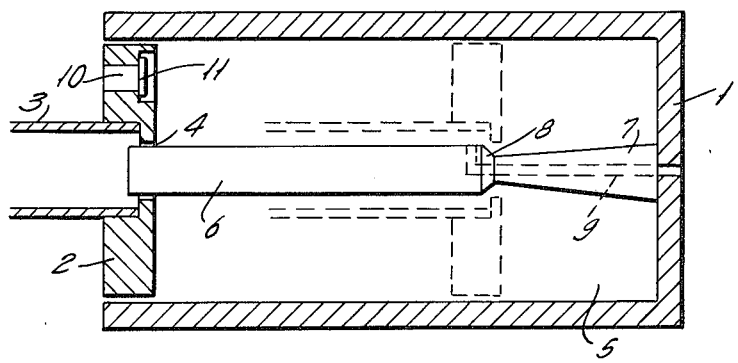

These and other objects of this invention will become apparent from the following description when taken in connection with the drawings, in which:

FIGURE 1 is a cross-sectional view of a cylinder and cooperating piston which incorporates the principle of the present invention.

Figure 2:
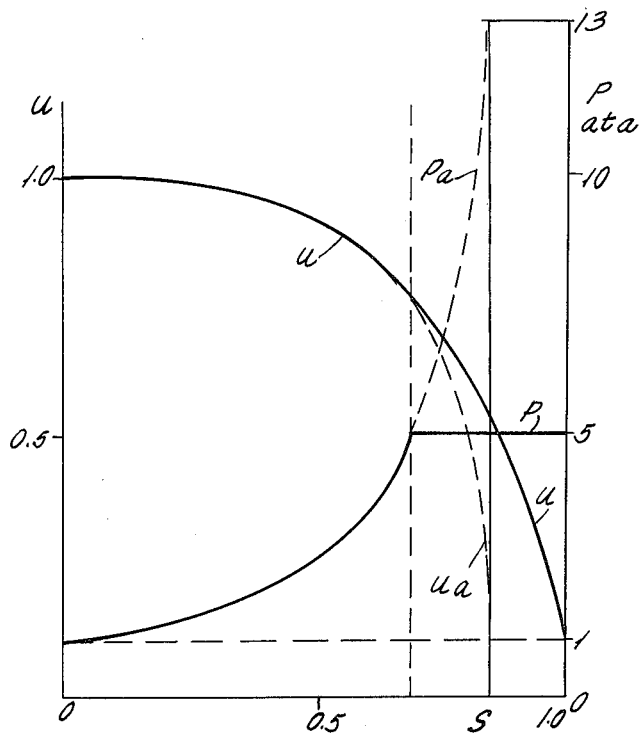

FIGURE 2 diagrammatically illustrates piston speed as a function of its travel within the cylinder for the arrangement of FIGURE 1.

It is well known that for a piston which has an area A and moves with a speed $u$ within a cylinder which has an outlet opening therein having an area F, the pressure of the air compressed by the piston will be proportional to $f(p)=u.A/F$ where $f(p)$ is some function of the pressure compressed beneath the piston. Since A is a constant then the ratio of $u/F$ will be constant if $p$ is constant. These circumstances make it possible to construct a pneumatic damping device having extremely desirable properties and which avoids the well known difficulties in present damping devices wherein the maximum opposing force is developed at only the end of the movement which is to be damped and which is due to adiabatic heating of the compressed air and steep increase in pressure following this heating. Thus, when these conditions are obtained, there will be a very powerful rebound force after the motion being damped has been brought to zero if no special mechanisms are used to prevent this rebound.

In accordance with the invention, the braking motion of the piston with respect to a cylinder is divided into two portions. During the first portion of the motion, the pressure in the compression chamber beneath the piston rises to some predetermined value in the usual manner. This value is then kept essentially constant during the second portion of the motion of the piston with respect to the cylinder by arranging a novel escape opening in the compression chamber which is quickly opened and thereafter slowly closed while the piston travels towards the bottom of the cylinder. The speed of the piston is therefore gradually reduced to zero since the quantity $u/F$ is held constant. That is to say, during the second range of motion of the piston the braking force of the pressure $p$ within the compression chamber acting over the area A of the piston will remain constant so that there will be a gradual decrease in the speed of the piston to a zero value when it reaches its end position which can be e.g. the bottom of the cylinder.

Referring first to FIGURE 1, there is illustrated therein a cylinder 1 which has a piston 2 movable therein. The piston 2 preferably fits the cylinder piston 1 in an air-tight manner by the provision of the usual piston rings (not shown). The piston 2 is then connected to an operating rod 3 which is in turn connected to some suitable mechanism whose motion is to be damped to zero as this mechanism causes rod 3 to move piston 2 toward the bottom of cylinder 1.

A novel rod 6 is then secured within chamber 5 formed by cylinder 1 where the rod 6 has a length sufficiently long to enter into an opening 4 in piston 2 preferably in an air-tight manner. The piston 2 is movable down the rod 6, it being noted that the piston rod 3 is hollow to accommodate rod 6 as piston 2 moves to the right and toward the dotted line position shown in FIGURE 1. Suitable pressure rings (not shown) may extend across the opening 4 to complete the air-tight seal between rod 6 and piston 2.

The right-hand portion of rod 6 is then provided with a conical section 7 which is secured to the base of cylinder 1 in any suitable manner in order to support the complete rod structure. The tapered surface portion 7 narrows downwardly to the shoulder 8 at which point the rod 6 takes on its constant normal diameter.

It is to be specifically noted that while FIGURE 1 illustrates the rod 6 and its conical portion 7 as being supported from its cylinder 1, that the concept of the invention also embraces the securement of the rod to piston 2 with the rod passing through a respective opening in the cylinder bottom and being moved with piston 2.

If desired, the tapered section 7 of the rod may have a channel 9 therein which permits air leakage from chamber 5 to areas exterior of cylinder 1. Moreover, the piston 2 can have an opening 10 therethrough which has a one way valve 11 which could be a flutter type valve to permit easy movement of the piston 2 in direction from the bottom of the cylinder 1 to the position shown in FIGURE 1.

In operation and when some movable body connected to piston rod 3 is moved to drive piston 2 to the right, the pressure within chamber 5 gradually increases, thus applying an increasing opposing force to the motion of piston 2 to absorb the inertia of the body attached to rod 3. The pressure beneath the piston 2 during this first portion of the motion of piston 2 can be controlled by means of the channel 9 which permits a continued exhaust of gas from the compressed volume to areas external of cylinder 1. If desired, some suitable control valve can also be connected to conduit 9.

Once the piston 2 reaches the location shown in FIGURE 1 in dotted lines, the opening 4 passes the beveled shoulder portion 8 so that the pressure beneath piston 2 can be vented through opening 4 in a controlled manner. The exact angle used for the beveled shoulder 8 will control this immediate release in pressure while the axial location of beveled shoulder 8 will determine the position of piston 2 at which this pressure release is obtained. As the piston 2 continues to move toward the bottom of cylinder 1, the effective opening between the opening 4 in piston 2 and the conical rod section 7 will decrease since the rod tapers outwardly. Therefore, as the volume beneath piston 2 decreases as well as its speed the escape opening for air trapped in this volume also decreases therefore causing a constant pressure to be trapped beneath piston 2. It is to be particularly noted that the diameter of conical portion 7 at its largest diameter portion adjacent the bottom of cylinder 1 is substantially equal to the diameter of opening 4.

This novel operation is illustrated in FIGURE 2 wherein the vertical axis illustrates the speed of the piston on a per unit basis as compared to the piston travel $s$ which is similarly plotted on a per unit basis.

As illustrated in the curve labeled $Pa$, the pressure beneath the piston gradually rises from one atmosphere to approximately 5 atmospheres at which point the piston reaches the dotted line position shown in FIGURE 1. It is to be noted, as shown by the dotted line segment of line $Pa$ in FIGURE 2, that in the normal case this pressure continues to increase to a value of the order of 13 atmospheres, thus leading to very strong rebound in prior art devices.

FIGURE 2 also shows the speed of the piston, represented by the curve $u$ which is gradually decreasing. Note that in the prior art techniques and as represented by dotted line portion of curve $\alpha$ that the piston speed reaches zero prior to its full motion within the cylinder and when the typical value of 13 atmospheres is reached below the piston.

In accordance with the present invention, however, and since there is pressure relief obtained when shoulder 8 is reached and further since the pressure relief is gradually throttled as the piston moves along the tapered surface of section 7, the pressure in chamber 5 is held to the order of 5 atmospheres. Therefore, the speed of the piston, as shown by the continuing solid line of curve $u$ decreases gradually to zero when the bottom of the piston is reached.

It is to be particularly noted from FIGURE 2 that the present invention permits the piston to travel the full length of cylinder 1 and reduces the speed to zero when the bottom of the piston is reached. Moreover, there will be no rebounding force applied against the bottom of the piston since all of the air beneath the piston is released the instant the piston reaches the bottom.

This novel result can also be understood when considering that since the pressure is held constant in the second portion of the motion of the piston (5 atmospheres in FIGURE 2) that the quantity $p$ times A is constant so that the value $u/F$ is constant. Therefore, as the speed $u$ is decreased, the opposing force which normally causes rebound also necessarily reduces towards zero.

Although there has been described a preferred embodiment of this novel invention, many variations and modifications will now be apparent to those skilled in the art. Therefore, this invention is to be limited, not by the specific disclosure herein, but only by the appending claims.

I claim:
1. A damping device comprising:
    (a) a cylinder member and a piston member movable therein, and together forming a compression space;
    (b) one of said members having an opening therein, said opening being aligned with the direction of movement of said piston;
    (c) a control rod connected to the other of said members and movable in said opening;
    (d) said control rod having, adjacent the member to which it is connected, a portion of a cross-section which decreases gradually away from such member to an area of least cross-section, and, beyond such area, a cylindrical portion of substantially greater cross-section than said area;
    (e) said rod having a passage therein opening to the outside of the rod at a point of said cylindrical portion adjacent such area and extending to the outside of the member to which the control rod is connected, whereby said passage is closed when said piston moves beyond said point in the direction of said portion of decreasing cross-section.
2. A device as claimed in claim 1 in which the control rod is connected to the cylinder member.
3. In a device as claimed in claim 1:
    (f) said rod having a sloping shoulder connecting said area of least cross-section and said cylindrical portion.

References Cited by the Examiner
UNITED STATES PATENTS

| 1,085,070 | 1/1914 | Voight | 188—96 |
| 1,595,330 | 8/1926 | Woodward | 267—8 |
| 2,244,501 | 6/1941 | Pierce | 188—88 |

FOREIGN PATENTS

| 792,895 | 4/1958 | Great Britain. |
| 1,052,624 | 1/1954 | France. |

MILTON BUCHLER, Primary Examiner.

ARTHUR L. LA POINT, Examiner.